United States Patent [19]

Roesler et al.

[11] Patent Number: 6,086,785
[45] Date of Patent: Jul. 11, 2000

[54] SOLID PEROXO COMPOUNDS AND PEROXY COMPOUNDS STABILIZED BY COATING

[75] Inventors: Richard Roesler, Kraainem, Belgium; Manfred Mathes, Bad Hoenningen; Gerd Hecken, Vettelschoss, both of Germany

[73] Assignee: Solvay Interox GmbH, Hannover, Germany

[21] Appl. No.: 09/091,339

[22] PCT Filed: Dec. 11, 1996

[86] PCT No.: PCT/EP96/05526

§ 371 Date: Nov. 18, 1998

§ 102(e) Date: Nov. 18, 1998

[87] PCT Pub. No.: WO97/22548

PCT Pub. Date: Jun. 26, 1997

[30] Foreign Application Priority Data

Dec. 18, 1995 [DE] Germany ............................ 195 47 055

[51] Int. Cl.[7] ................................ A01N 3/00; A62D 3/00; B32B 5/16; B05D 7/00

[52] U.S. Cl. ................................ 252/186.26; 252/186.31; 428/403; 427/220

[58] Field of Search ........................ 252/186.31, 186.26; 428/403

[56] References Cited

U.S. PATENT DOCUMENTS

| | | | |
|---|---|---|---|
| 5,332,518 | 7/1994 | Kuroda et al. | 252/99 |
| 5,407,685 | 4/1995 | Malchesky et al. | 424/449 |
| 5,462,692 | 10/1995 | Roesler et al. | 252/186.26 |
| 5,505,875 | 4/1996 | Beaujean et al. | 252/186.27 |
| 5,902,682 | 5/1999 | Bertsch-Frank et al. | 428/403 |

FOREIGN PATENT DOCUMENTS

| | | |
|---|---|---|
| 0407189 A1 | 1/1991 | European Pat. Off. . |
| 0573731 A1 | 12/1993 | European Pat. Off. . |
| 2406455 | 8/1975 | Germany . |
| 4136172 | 6/1992 | Germany . |
| 05-319809 | 12/1993 | Japan . |
| WO 92/17404 | 10/1992 | WIPO . |

*Primary Examiner*—Yogendra Gupta
*Assistant Examiner*—John M. Petruncio
*Attorney, Agent, or Firm*—Evenson, McKeown, Edwards & Lenahan, P.L.L.C.

[57] ABSTRACT

The stabilization of solid peroxo and peroxy compounds, in particular of sodium percarbonate and acetyl peroxyborate compounds is described, which can be achieved by coating the peroxo and peroxy compounds with a coating material which is a mixture of essentially a) a fatty acid or preferably an alkali metal or alkaline earth metal salt thereof and b) an anionic surfactant from the group of longer chain substituted sulphonates and sulphates.

24 Claims, No Drawings

SOLID PEROXO COMPOUNDS AND PEROXY COMPOUNDS STABILIZED BY COATING

DESCRIPTION

The invention relates to the stabilisation of solid peroxo and peroxy compounds, in particular of sodium percarbonate and acetyl peroxyborate compounds by coating with a coating material.

Peroxo and peroxy compounds according to the meaning of the invention consist of inorganic and organic compounds containing active oxygen, which are used in various fields of application, e.g. in detergent compositions or, if necessary, also in disinfectant compositions. Peroxo compounds are consequently inorganic peroxo salts containing active oxygen such as e.g. peroxoborates or percarbonates. Solid peroxy compounds are consequently organic compounds containing active oxygen such as e.g. organic peracids or derivatives liberating these; a particular type of solid peroxy compounds within the framework of the present invention consists of the acetyl peroxyborate compounds which are described below in further detail.

It is well known that peroxo compounds can be used as bleaching compounds in detergent mixtures in powder form. In the usual household heavy-duty detergents, sodium perborate tetrahydrate or sodium perborate monohydrate is usually used as bleaching agent since these materials are relatively stable to decomposition in pure detergent media. With increasing frequency, however, other alkali metal peroxo salts, in particular peroxocarbonate (percarbonate) are also being used. Although these alkali metal peroxo salts, in particular the percarbonate, are stable in the pure, dry state, they have the disadvantage of decomposing easily in the presence of moisture with loss of active oxygen. It is consequently necessary, to protect the alkali metal peroxo salts against moisture from the outside by coating them with a suitable coating. For an effective protection of the alkali metal peroxo salt, care should be taken to ensure that the coating is as complete as possible. Apart from the coating and the protective function, the coating materials used should also be able to take on additional functions in ready-to-use compositions containing the coated alkali metal peroxo salt.

Acetyl peroxyborate compounds are solid compounds containing active oxygen, which are based on acetic acid and boron oxygen compounds and known from DE 41 36 172. These compounds, hereinafter referred to as acetyl peroxyborates, are characterised by their content of peracetic acid which can be liberated in water, instantaneously and directly. Peracetic acid is characterised in comparison with purely inorganic percompounds by its low active temperature and high bleaching and disinfectant power. Peracetic acid is safe for the environment and characterised by a good water solubility. However, one of the disadvantages of peracetic acid consists in that it is liquid at room temperature and, moreover, can be produced only as a solution of peracetic acid in acetic acid but not in the pure state. This restricts the possibilities for using the peracetic acid. Acetyl peroxyborates overcome this disadvantage. They are colourless solid compounds which, as such, have an advantageous active oxygen stability at normal temperatures and, are chemically and physically non-critical during storage and handling. However, acetyl peroxyborates have the disadvantage of exhibiting a relatively low storage stability in contact with the usual basic detergent components and of tending towards premature decomposition with liberation of peracetic acid and consequently loss of active oxygen content. It is therefore necessary to protect the acetyl peroxyborate compounds in the same way as the alkali metal peroxo salts with a suitable coating against moisture.

It is the task of the present invention to provide a coating process for solid peroxo and peroxy compounds, in particular however for sodium percarbonate and acetyl peroxyborates, by means of which their stability in storage is improved in the presence of detergent powder components.

It has now been found that stabilisation of solid peroxo and peroxy compounds, in particular of sodium percarbonate and the acetyl peroxyborates known from DE 41 36 172 can be achieved by coating with a mixture of essentially a) a fatty acid or preferably an alkali metal or alkaline earth metal salt thereof and b) an anionic surfactant from the group of the longer chain substituted sulphonates and sulphates.

The subject matter of the invention is consequently a process for stabilising solid peroxo and peroxy compounds, characterised in that solid particles of the peroxo and peroxy compounds, in particular solid particles of sodium percarbonate or of acetyl peroxyborate compounds are coated with a coating material which contains essentially a mixture of a) an aliphatic carboxylic acid with 10 to 22 carbon atoms or preferably an alkali and alkaline earth metal salt thereof and b) an alkali or alkaline earth metal salt of an anionic surfactant, the anion of the surfactant satisfying the general formula I

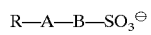

$$R\text{—}A\text{—}B\text{—}SO_3^{\ominus} \qquad\qquad I$$

where

| | |
|---|---|
| A | represents a bond or an aromatic hydrocarbon group with 6 to 10 carbon atoms, which may if necessary by substituted by $SP_3^{\ominus}$ radicals or a lower alkyl, |
| B | represents a bond or oxygen and |
| R | represents an alkyl radical with 8 to 18 carbon atoms. |

Moreover, the coated solid particles of the peroxo and peroxy compounds, which are stabilised by coating with the coating material described above, in particular those of sodium carbonate and acetyl peroxyborate compounds, are the subject matter of the present invention.

According to a variation of the invention, particulate alkali metal peroxo salts are suitable for use as peroxo compounds to be coated, in particular those from the group of peroxocarbonate (percarbonate), peroxopyrophosphate, peroxotripolyphosphate, peroxomono and peroxodisulphate and peroxoborates. These alkali metal peroxo salts can be produced according to processes known in the state of the art and granulated, if necessary. An alkali metal peroxo salt that is preferred for coating according to the invention is sodium percarbonate.

According to another variation of the invention, solid organic percarboxylic acids and their derivatives are suitable peroxy compounds; acetyl peroxyborate compounds are preferred. The compounds defined in DE 41 36 172 can be used as acetyl peroxyborates to be coated; they are characterised by an active oxygen content of 2 to 8% by wt. and by a content of peracetic acid of at least 10% by wt., preferably of 10 to 30% by wt. and of hydrogen peroxide of less than 4% by wt., which content can be liberated in water on dissolution of the acetyl oxyborate compound.

Solid acetyl peroxyborate can be obtained in the manner described in DE 41 36 172 by reacting a) a solid boron oxygen compound with acetic acid and hydrogen peroxide and/or b) a solid boron oxygen compound with a solution of peracetic acid in acetic acid and/or c) a solid boron oxygen compound containing peroxygen with acetic acid, if necessary with the addition of acetic anhydride and in process variations a) and b) if necessary with an addition of alkaline sodium salt to form a viscous solution, suspension or paste and the acetyl peroxyborate thus formed is obtained from this by known drying methods. The acetyl peroxyborates thus produced contain acetyl groups, peracetyl groups and borate structures

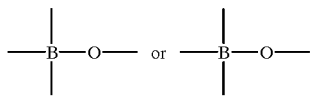

which are arranged in the acetyl peroxyborate compound in such a way that the chemical characteristics (liberation of active oxygen, peracetic acid and $H_2O_2$) indicated above are obtained. In addition, the acetyl peroxyborates exhibit e.g. IR absorption bands at approx. 1650 to 1670 cm$^{-1}$ and at 1740 to 1755 cm$^{-1}$; in the solid body —$^{13}$C—NMR, measured against tetramethyl silane (TMS) as external standard, a band is observed at 18 to 19 ppm.

The coating material used according to the invention for stabilising peroxo and peroxy compounds, in particular sodium carbonate and acetyl peroxyborate contains essentially a mixture of one of the aliphatic carboxylic acids defined above or preferably one of its salts and one of the anionic surfactants defined above, preferably from the group of sulphates.

Higher fatty acids or mixtures with melting temperatures in the region of approx. 40 to 70° C. are suitable as aliphatic carboxylic acids. These include higher fatty acids which contain 10 to 22, preferably 12 to 18, in particular 12 or 18 carbon atoms. These are preferably fatty acids with a straight-chain, saturated, aliphatic radical. As examples of fatty acids suitable for use according to the invention, capric acid, lauric acid, stearic acid, palmitic acid, arachic acid or behenic acid can be mentioned. Lauric acid and stearic acids prove to be particularly suitable; they are present in the form of their sodium salts. Naturally occurring fatty acid mixtures, e.g. coconut fatty acid or tallow fatty acid or the salts thereof can also be used for the coating material. The fatty acids are used in particular as alkali or alkaline earth metal salt; the sodium salts are particularly preferred.

The anionic surfactants suitable for use according to the invention include ammonium, alkali metal and alkaline earth metal salts, preferably alkali metal salts, in particular sodium salts, of longer chain aliphatic or aromatic sulphonic acids or of sulphates monosubstituted by longer chain aliphatic radicals. In the salts with the anions of formula I, which are used as anionic surfactants according to the invention, R represents an alkyl radical with 8 to 18, in particular 8 to 12 carbon atoms. A may represent a bond or an aromatic hydrocarbon group with 6 to 10 carbon atoms, which may if necessary by substituted by $SO_3^{\ominus}$ radicals or lower alkyl, in particular a phenyl group. The R—A group can preferably represent a straight chain $C_8$—$C_{12}$ alkyl group or, if necessary, a $C_8$—$C_{12}$ alkyl phenyl group. B may represent a bond or oxygen. The surfactants used according to the invention consequently include alkyl sulphates and alkyl sulphonates as well as alkyl aryl sulphonates; among the latter in particular alkylbenzene sulphonates. The alkali metal salts of monoalkyl sulphates or of aliphatic and aromatic sulphonic acids are suitable anionic surfactants, the alkali metal salts of monoalkyl sulphates being preferred. Sodium dodecylsulphate (also called sodium lauryl sulphate) and sodium dodecylsulphonate (sodium lauryl sulphonate) have proved to be particularly suitable.

The quantity of coating material appropriately amounts to at least 2, preferably at least 3 but not more than 30% by wt., based on the total weight of the coated particles. In the case of sodium carbonate particles, the coating consequently amounts to 2 to 20% by wt., preferably 2 to 10% by wt. and in particular 3 to 6% by wt. of the total weight of the particles. In the case of acetyl peroxyborate particles, the coating consequently amounts to 2 to 20% by wt., preferably 2 to 10% by wt. and in particular 3 to 6% by wt. of the total weight of the particles.

The ratio of aliphatic carboxylic acid or its salt to anionic surfactant in the coating material can vary depending on the type of acid or its salt used and the surfactant employed. In general, a weight ratio of aliphatic carboxylic acid or its salt to anionic surfactant of 1:4 to 4:1, preferably 1:2 to 2:1, in particular 1:1.5 to 1.5:1 has proved appropriate. When a mixture of stearic acid (sodium salt) and sodium dodecylsulphate is used, for example, a weight ratio of stearic acid (sodium salts) to sodium dodecylsulphate of approx. 1:1 is appropriately present.

The particulate peroxo and peroxy compounds coated according to the invention consist of a nucleus which consists essentially of an alkali metal peroxo salt or an acetyl peroxyborate and of a coating layer surrounding the nucleus which contains as coating material, an essential portion of the mixture of fatty acid or its alkali metal or alkaline earth metal salt and the anionic surfactant selected according to the invention; if necessary, the coating layer can also contain a certain proportion of other common coating materials and/or auxiliary substances commonly used in the production of alkali metal peroxo salt or acetyl peroxyborate.

According to an appropriate variation of the invention, the coating layer according to the invention contains the mixture of fatty acid (or its salt) and anionic surfactant in a quantity of at least 60% by wt., preferably of at least 70% by wt. (based on the total weight of the coating layer).

Apart from the coating materials described above, it is possible for the coating material according to the invention to contain in addition a small proportion of other common coating materials and/or other auxiliary substances commonly used in the manufacture of alkali metal peroxo salts or acetyl peroxyborate. The proportion of such other coating materials and auxiliaries should be up to maximum 40% by wt., preferably up to maximum 30% by wt., based on the total coating material. In other words, it can be between 0 and 40% by wt. inclusive, preferably between 0 and 30% by wt. inclusive of the coating material. The auxiliary agents commonly used e.g. in the manufacture of sodium percarbonate or acetyl peroxyborate, which may be present in the coating material according to the invention, include for example sodium polyphosphates, in particular sodium hexametaphosphate, which may be present for example in quantities of 0 to 10% by wt., based on the coating material; sodium polycarboxylates, in particular sodium salts of acrylic acid polymers such as acrylic acid homopolymers or acrylic acid/maleic acid copolymers with a molecular weight in the region of 2,500 to 100,000, in particular sodium polyacrylates which may be present in quantities of 0 to 10% by wt., based on the coating material; sodium silicates, preferably waterglass (WG) with a ratio of $SiO_2$: $Na_2O$ of 3.5:1 to 2:1, which may be present in quantities of 0 to 35% by wt., based on the coating material; phosphonic acids, in particular lower alkane mono or diphosphonic acids, which may be substituted if necessary by hydroxy, e.g. 1-hydroxyethane-1,1-diphosphonic acid, or their salts, which may be present in quantities of 0 to 35% by wt., based on the coating material; and water-soluble magnesium salts, in particular magnesium sulphate which may be present in quantities of 0 to 10% by wt., based on the coating material. Apart from the auxiliary agents mentioned above, it is obvious that all other auxiliary agents known to be suitable for use for the manufacture of alkali metal peroxo salts and in particular of sodium percarbonate to be present in the coating material in a quantity such that the total quantity of coating material and auxiliaries does not exceed 40% by wt., preferably 30% by wt., based on the coating as a whole.

Coating of the particles of peroxo and peroxy compounds, in particular the sodium percarbonate particles and acetyl peroxyborate particles with the coating material according to the invention can take place in the known way. Appropriately, the sodium percarbonate particles or the solid acetyl peroxyborate particles, for example, are treated, for coating with the coating material, with an aqueous solution or suspension of the coating material and dried. Preferably, the aqueous coating solution or suspension is sprayed in the known way onto the particles in a dryer through which hot air passes, while drying takes place simultaneously. The temperature of the aqueous coating solution or suspension can vary depending on its solids content and is appropriately within the region between room temperature and 60° C. The temperature in the dryer is appropriately adjusted in such a way that an off-gas temperature, for example, in the region of 60 to 80° C. is maintained. The coating can also be applied in a plough shear mixer or a ring layer mixer and the damp particles thus obtained then passed to a drying facility.

The aqueous coating solution or suspension can contain the aliphatic carboxylic acid or its salt in quantities of 5 to 30% by wt. The surfactant content of the coating solution or suspension is generally 5 to 30% by wt.

The alkali metal peroxo salt particles coated according to the invention, preferably sodium percarbonate particles and acetyl peroxyborate particles exhibit a satisfactory stability during storage in mixture with the usual detergent components.

The following examples are to provide a more detailed explanation of the invention without limiting its scope.

The following terms have the following meaning: rpm=revolutions per minute; min=minute; RT=room or ambient temperature; %=% by weight; h=hour; vac.=vacuum; NaOH=sodium hydroxide; AO=active oxygen content; LKB=heat flow measurements; PCS=sodium percarbonate; turpinal SL=aqueous 60% by wt. solution of 1-hydroxyethane-1, 1-diphosphonic acid (=HEDP); SS=sodium stearate; SLS=sodium lauryl sulphate (=sodium dodecylsulphate); WG=waterglass

EXAMPLE 1

The following process was used for the production of sample quantities of PCS particles coated according to the invention.

A weighed quantity of 2 to 2.5 kg sodium percarbonate was filled into a Lödige mixer and the mixer shaft was adjusted to a speed of approx. 200 rpm. Subsequently, the quantity (c) of the coating agent (=coating materials dissolved completely in water to a clear solution), which was calculated for the coating level (b) concerned, was metered homogeneously within 1 minute via a droplet funnel into the mixer. Following the addition of the coating agent, mixing was continued for approx. a further 1 minute. Subsequently, the damp product was removed from the mixer and dried in a smooth fluid bed dryer with an input air temperature of 95 to 120° C. and an off-gas temperature of up to 80° C. The amount of input air was adjusted in such a way that a slight vacuum was present in the dryer and complete mixing of the product by a vortex action was simultaneously achieved. As soon as the off-gas temperature of 80° C. was reached, the product was removed from the dryer and cooled to room temperature in the air.

Calculation of the coating level (b), quantity of coating agent required (c) and moisture content (d) following the addition of the coating agent and the quantity of the coating material to be applied (=solid, a)

$$b[\%] = \frac{a[g] * 100}{e[g]} \qquad c[g] = \frac{a[g] * 100}{g[\%]}$$

$$d[\%] = \frac{c[g] * (100 - g[\%])}{c[g] + f[g]} \qquad a[g] = \frac{b[\%] * 1000}{100 - b[\%]}$$

where:
 a=coating layer=solid to be applied (d)
 b=degree of coating [%]=percentage of coating layer (total content of substance) in the end product
 c=coat agent to be applied (g) (=coating solution)
 d=moisture content [%]=water content of the product in percent following the addition of the coating solution
 e=coated sodium percarbonate [g]=PCS+coating layer
 f=sodium percarbonate, starting product [g]
 g=solids content [%] of the coating solution An aqueous solution or suspension was used as coating solution which consisted of the quantities of fatty acid salt, surfactant and, if necessary, the other coating materials and auxiliary agents as well as residual water (experiments no. 1 to 6) indicated in table I, per 1,000 solution or suspension. The average grain diameter of the PCS used amounted to approx. 400 to 500 μm. PCS particles coated according to the above process having the properties indicated in the table I were obtained.

EXAMPLE 2

Investigations into the stability of PCS

Heat flow measurements (LKB) measurements were carried out on sodium percarbonate products coated according to the invention and produced in the above example, in order to assess their storage capacity and the stability properties. In the case of these heat flow measurements, the heat flows which arise under isothermic measuring conditions provide an indication of the stability of the product containing active oxygen; in particular, the stability of the product in the presence of detergent components can be determined if the heat flow measurements are carried out on samples in which the active-oxygen-containing product is present in mixture with the detergent components. For the heat flow measurement thus carried out, the PCS products coated according to the invention were therefore introduced into a detergent base in such a quantity that the active oxygen content amounted to 2%. The detergent base used consisted of a standard detergent free from active oxygen and based on zeolite, which detergent contains zeolite, linear alkyl sulphonates, soap, carboxymethylcellulose, soda and optical brighteners in the usual quantities as components. The heat flow measurements were carried out on these samples in an LKB 2277 Bio Activity Monitor at 40° C. over a period of 20.

The lower the heat flow measured, the greater is the stability of the product containing active oxygen in the detergent base and the more advantageous is the coating of the coated PCS particles. The results are indicated in table I; for comparison, uncoated PCS exhibits approximate LKB values of 45 to 60 µH/g.

EXAMPLE 3

Determination of the dissolution behaviour

The rate of dissolution in water indicated in the examples was determined in the known way in a 2 l container equipped with a stainless steel stirrer which features a shaft with 2 vertical agitator blades of 42 mm length, 11 mm high, and a motor with an output of 350 rpm, the shaft of which is insulated with polyethylene at the facility for fixing it to the motor. For the determination, 2 g substance were introduced into 1 l demineralised water at 15° C. and stirred. The quantity of dissolved substance was determined by conductivity measurement in the solution. The results are indicated in table I.

EXAMPLE 4

Coating of acetyl peroxyborate particles a) For the coating tests, an acetyl peroxyborate was used which was characterised as follows (average values)

| | |
|---|---|
| 23% by wt. | peracetic acid that can be liberated in water |
| 0.1% by wt. | H$_2$O$_2$ that can be liberated in water (manual titration in each case) |
| 23.2% by wt. | peracetic acid content |
| 9.3% by wt. | sodium content |
| 9.6% by wt. | boron content |
| 28.6% by wt. | acetic acid content (titration in the titrator in each case) |

LKB stability measurement (compare example 5) in detergent base (0.13 g acetyl peroxyborate, 0.87 g detergent base): 273 µH/g.

b) Coating of acetyl peroxyborate took place essentially in the same way as coating of PCS (example 1).

In a Lödige mixer, 1.5 kg of the acetyl peroxyborate described above were mixed with 251 g coating solution (previously heated to 50 to 60° C.). The coating solution had the following composition:

125 g/kg sodium stearate
125 g/kg sodium lauryl sulphate

The damp product obtained by mixing, which tends to form agglomerates, was transferred into a smooth fluid bed dryer and dried at an input air temperature of 90° C. to 100° C. and an off-gas temperature of up to 80° C. The cooled product removed from the dryer had the following properties (average values):

coating level: 4% by wt.

grain size fraction: >2000 µm 50% by wt.

grain size fraction: 250–2000 µm 50% by wt.
with the following properties:

| | |
|---|---|
| 21.4% by wt. | peracetic acid that can be liberated in water |
| 0.2% by wt. | H$_2$O$_2$ that can be liberated in water (manual titration in each case) |
| 22.7% by wt. | peracetic acid |
| 9.3% by wt. | sodium |
| 9.6% by wt. | boron |
| 28.6% by wt. | acetic acid |

LKB stability measurement (compare example 5) in detergent base (0.14 g acetyl peroxyborate, 0.86 g detergent base): 89 µH/g.

c) In line with the above experiment b) and example 1, 1.5 kg of the acetyl peroxyborate described under a) was mixed with 213 g of the coating solution having the following composition:

| | |
|---|---|
| 109 g/kg | sodium stearate |
| 109 g/kg | sodium lauryl sulphate |
| 7 g/kg | Turpinal SL |

The damp product obtained by mixing, which tends to form agglomerates, was transferred into a smooth fluid bed dryer and dried at an input air temperature of 90° C. to 100° C. and an off-gas temperature of up to 80° C. The cooled product removed from the dryer had the following properties (average values):

coating level: 4% by wt.

grain size fraction: >2000 µm 30% by wt.

grain size fraction: 250–200 µm 70% by wt.
with the following properties:

| | |
|---|---|
| 21.6% by wt. | peracetic acid that can be liberated in water |
| 0.2% by wt. | H$_2$O$_2$ that can be liberated in water (manual titration in each case) |
| 23.4% by wt. | peracetic acid content |
| 9.2% by wt. | sodium content |
| 9.7% by wt. | boron content |
| 26.3% by wt. | acetic acid content (titration in the titrator in each case) |

LKB stability measurement (compare example 5) in detergent base (0.139 g acetyl peroxyborate, 0.861 g detergent base): 92 µH/g.

EXAMPLE 5

Stability investigations on acetyl peroxyborate

For the investigation of the stability of the coated acetyl peroxyborate particles in the presence of detergent components, the coated acetyl peroxyborate particles produced in the above example 4 and, for reference, uncoated acetyl peroxyborate particles were each introduced into a base powder of a commercial zeolite-containing compact detergent in a quantity corresponding to 3% by wt. liberatable peracetic acid (based on the resulting overall mixture) in line with example 2. Subsequently, the decomposition of the acetyl peroxyborate accompanied by loss of active oxygen was determined in line with example 2 for the entire mixture at 40° C. by measuring the heat flow (µH/g) accompanying it, in a microcalorimeter. A high heat flow corresponds to a high rate of decomposition. The results are indicated in FIG. 4.

The results determined show that the acetyl peroxyborate particles coated according to the invention exhibit a much more advantageous stability than the uncoated particles.

TABLE 1

Sodium percarbonate coated according to the invention

| Test no. | 1 | 2 | 3 | 4 | 5 | 6 |
|---|---|---|---|---|---|---|
| Coating solutn. | 125 g/kg sodium stearate<br>125 g/kg sodium dodecylsulphate (sodium lauryl sulphate) | 125 g/kg sodium stearate<br>125 g/kg sodium dodecylsulphate (sodium lauryl sulphate) | 125 g/kg sodium stearate<br>125 g/kg sodium dodecylsulphate (sodium lauryl sulphate) | 90 g/kg sodium stearate<br>210 g/kg sodium dodecyl sulphate (sodiuu lauryl sulphate) | 101 g/kg sodium stearate<br>101 g/kg sodium dodecylsulphate (sodium lauryl sulphate)<br>15.2 g/kg $Na_2O$<br>52.0 g/kg $SiO_2$ | 109 g/kg sodium stearate<br>109 g/kg sodium dodecylsulphate (sodium lauryl sulphate)<br>76 g/kg Turpinal SL (100%) |
| Coating level | 4% | 2.6% | 6% | 4% | 4% (3%SS/SLS + 1%WG3.5R) | 4% |
| Drying | off-gas up to 60° C. | off-gas up to 80° C. | off-gas up to 80° C. | off-gas up to 80° C. | off-gas up to 80° C. | off-gas up to 80° C. |
| AO content | 13.8% | 13.9% | 13.3% | 13.8% | 13.8% | 13.8% |
| Sieve fraction | | | | | | |
| >1000 μm | 1.7% | 0.8% | 5.6% | 1.7% | 1.0% | 1.4% |
| >850 μm | 2.1% | 1.1% | 7.3% | 2.8% | 2.1% | 3.9% |
| >600 μm | 16.5% | 12.7% | 26.0% | 20.8% | 20.0% | 23.3% |
| >420 μm | 40.2% | 39.0% | 36.0% | 41.0% | 41.4% | 41.6% |
| >150 μm | 39.5% | 46.3% | 25.0% | 33.7% | 35.5% | 29.8% |
| >150 μm | 0.0% | 0.1% | 0.1% | 0.0% | 0.0% | 0.0% |
| Average grain diam. | 475 μm | 442 μm | 573 μm | — | — | — |
| LKB | | | | | | |
| without base + | 1.8 μH/g | 1.6 μH/g | 3.4 μH/g | 2.9 μH/g | 0.9 μH/g | 7.2 μH/g |
| detergent base | 6.4 μH/g | 12.0 μH/g | 6.2 μH/g | 7.8 μH/g | 11.9 μH/g | 7.2 μH/g |
| Rate of dissolution 350 rpm 15° C. | | | | | | |
| after 1 min. | 67% | 72% | 37% | 69% | 54% | 76% |
| after 2 mins. | 89% | 93% | 58% | 90% | 79% | 95% |
| after 3 mins. | 96% | 98% | 67% | 97% | 92% | 99% |

What is claimed is:

1. A process for stabilizing solid peroxo or peroxy compounds, said process comprising coating solid particles of the peroxo and peroxy compounds by spraying an aqueous solution or suspension of of a coating material on the particles and drying, wherein the coating material comprises at least 60 %-by weight of a mixture of
   a) an alkali or alkaline earth metal salt of an aliphatic carboxylic acid with 10 to 22 carbon atoms, with
   b) an alkali and alkaline earth metal salt of an anionic surfactant in a weight ratio of a) to b) in the mixture of 1:4 to 4:1, the anion of the surfactant satisfying the general formula I $$R—A—B—SO_3^- \qquad I$$

wherein
   A represents a bond or an aromatic hydrocarbon group with 6 to 10 carbon atoms, optionally substituted hy $SO_3^-$ groups or or lower alkyl groups,
   B represents a bond or oxygen, and
   R represents an alkyl group with 8 to 18 carbon atoms, and form 0 to 40 %-by weight of other coating materials or adjuvants selected from the group consisting of sodium tripolyphosphate, sodium polycarboxylates, sodium silicates, phosphonic acids and water-soluble magnesium salts.

2. A process according to claim 1, wherein the peroxo or peroxy compounds are sodium percarbonate or acetyl peroxyborate compounds.

3. A process according to claim 1, wherein the aliphatic carboxylic acid is a fatty acid with 12 to 18 carbon atoms.

4. A process according to claim 3, wherein the aliphatic carboxylic acid is a fatty acid with 12 or 18 carbon atoms.

5. Process according to claim 3, wherein component a) is a sodium salt of lauric acid or stearic acid.

6. A process according to claim 1, wherein the anionic surfactant is an alkali metal salt of a monoalkyl sulfate or an aliphatic or aromatic sulfonic acid.

7. A process according to claim 6, wherein the anionic surfactant is an alkali metal salt of a monoalkyl sulfate.

8. A process according to claim 2, wherein the anionic surfactant is sodium dodecylsulfate.

9. A process according to claim 1, wherein the coating material amounts to at least 2% by wt., based on the total weight of the coated particles.

10. A process according to claim 9, wherein the coating material amounts to at least 3 % by wt., based on the total weight of the coated particles.

11. A process according to claim 1, wherein a) the alkali or alkaline earth metal salt of the aliphatic carboxylic acid and b) the alkali or alkaline earth metal salt of the anionic surfactant are present in a weight ratio a) to b) of 1:2 to 2:1 in the coating material.

12. A process according to claim 11, wherein a) the alkali or alkaline earth metal salt of the aliphatic carboxylic acid and b) the alkali or alkaline earth metal salt of the anionic surfactant are present in the coating material in a weight ratio a) to b) of 1:1.5 to 1.5:1.

13. Stabilized particles of solid peroxo or peroxy compounds coated with a coating material which comprises at least 60 %-by weight of a mixture of a) an alkali or alkaline earth metal salt of an aliphatic carboxylic acid with 10 to 22 carbon atoms, with b) an alkali and alkaline earth metal salt of an anionic surfactant in a weight ratio of a) to b) in the mixture of 1:4 to 4:1, the anion of the surfactant satisfying the general formula I

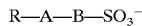    I where

A represents a bond or an aromatic hydrocarbon group with 6 to 10 carbon atoms, optionally substituted by $SO_3^-$ groups or lower alkyl groups, B represents a bond or oxygen, and R represents an alkyl group with 8 to 18 carbon atoms, and 0 to 40%- by weight of other coating materials of adjuvants selected from the group consisting of sodium tripolyphosphate, sodium polycarboxylates, sodium silicates, phosphonic acids and water-soluble magnesium salts.

14. Stabilized particles according to claim 13, wherein the peroxo or peroxy compound is a sodium percarbonate or an acetyl peroxyborate compound.

15. Stabilized particles according to claim 13, wherein the aliphatic carboxylic acid is a fatty acid with 12 to 18 carbon atoms.

16. Stabilized particles according to claim 15, wherein the aliphatic carboxylic acid is a fatty acid with 12 or 18 carbon atoms.

17. Stabilized particles according to claim 13, wherein component a) is a sodium salt of lauric acid or stearic acid.

18. Stabilized particles according to claim 13, wherein the anionic surfactant is an alkali metal salt of a monoalkyl sulfate or an aliphatic or aromatic sulfonic acid.

19. Stabilized particles according to claim 18, wherein the anionic surfactant is an alkali metal salt of a monoalkyl sulfate.

20. Stabilized particles according to claim 19, wherein the anionic surfactant is sodium dodecylsulfate.

21. Stabilized particles according to claim 13, wherein the coating material amounts to at least 2% by weight of the total weight of the coated particles.

22. Stabilized particles according to claim 21, wherein the coating material amounts to at least 3% by weight of the total weight of the coated particles.

23. Stabilized particles according to claim 13, wherein the coating material comprises a) the alkali or alkaline earth metal salt of the aliphatic carboxylic acid and b) the alkali or alkaline earth metal salt of the anionic surfactant in a weight ratio a) to b) of 1:2 to 2:1.

24. Stabilized particles according to claim 23, wherein the coating material comprises a) the alkali or alkaline earth metal salt of the aliphatic carboxylic acid and b) the alkali or alkaline earth metal salt of the anionic surfactant in a weight ratio a) to b) of 1:1.5 to 1.5:1.

* * * * *